United States Patent Office 3,005,960
Patented Oct. 24, 1961

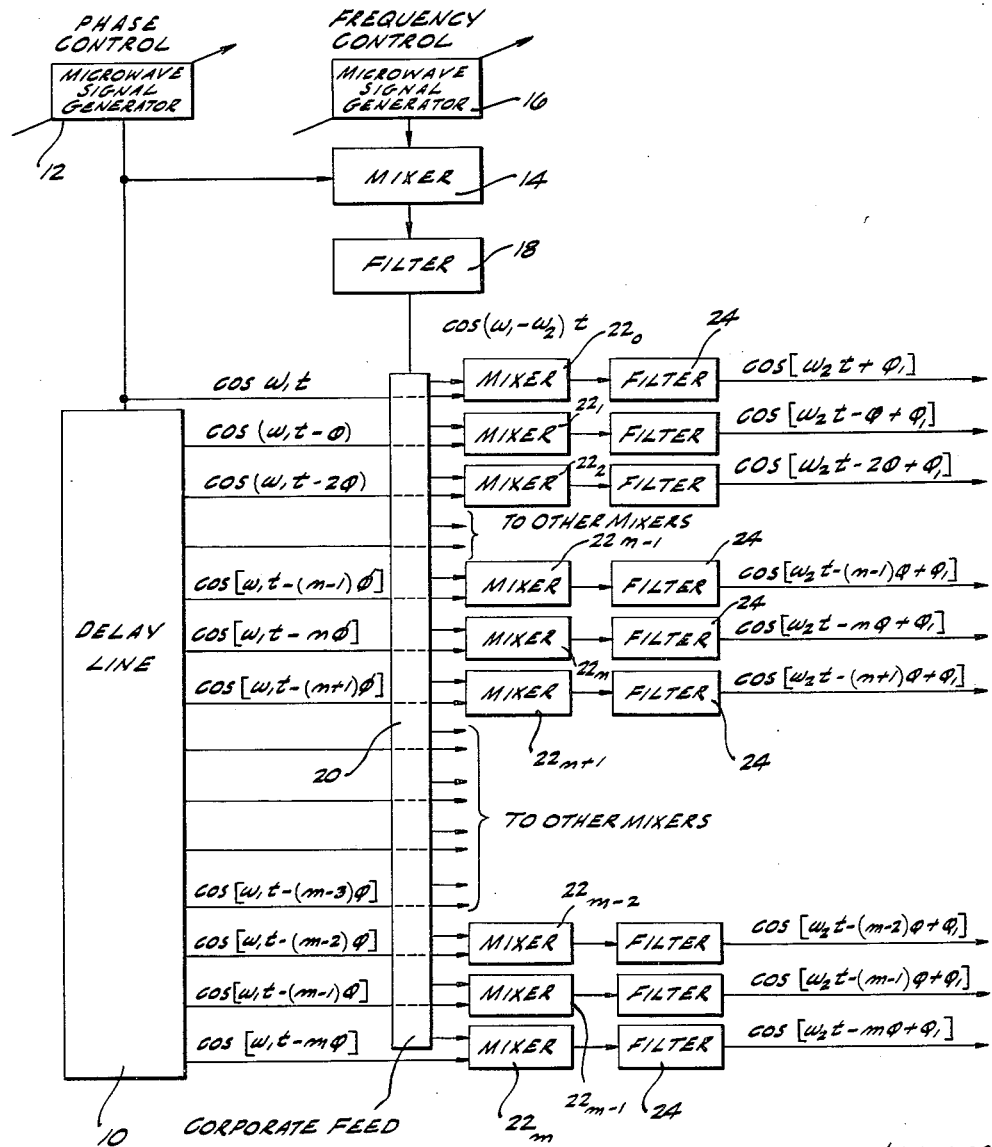

3,005,960
APPARATUS FOR GENERATING MULTIPLE SIGNALS WITH INDEPENDENTLY CONTROLLABLE PHASE DIFFERENCES AND FREQUENCY
Berl D. Levenson, Los Angeles, Calif., assignor to Hughes Aircraft Company, Culver City, Calif., a corporation of Delaware
Filed Jan. 24, 1958, Ser. No. 711,102
7 Claims. (Cl. 331—38)

The present invention relates to signal generating apparatus and more particularly to an apparatus for generating a plurality of signals of an independently controllable frequency, successive ones of the signals having uniform phase differences which may be independently controlled electronically without affecting the frequency.

The apparatus of the present invention is particularly adapted for use in conjunction with an electronic scanning radar system wherein the phase difference between successive signals determines the direction of a pencil receiving beam. An electronic scanning radar system of this type is described in a co-pending application for patent, Serial No. 707,068, entitled, "Electronic Scanning Radar System," filed by Berl D. Levenson and William R. Welty on January 3, 1958 and assigned to the same assignee as in the present case. In the operation of a radar system of the aforementioned type, it is often necessary to change the direction of the pencil receiving or transmitting beam in an extremely short interval of time. Because of this, it is highly desirable to use an entirely electronically controlled apparatus, to effect a change in direction of the pencil beam. A mechanical apparatus, on the other hand, possesses inherent inertia which places limitations on its use. Also, when the apparatus of the present invention is used in conjunction with the above type of electronic scanning radar system, the frequency of plurality of signals generated by the present apparatus must be mixed with a first intermediate frequency of the radar system and filtered to result in a second intermediate frequency in the system. Hence, it is evident that it must be necessary to control the frequency of the plurality of signals generated by the instant apparatus independently from any changes in the phase differences between the signals. Further, the apparatus of the present invention provides more accurate phase differences than is generally possible by using mechanical expedients.

In accordance with the present invention, a delay line which may comprise a sinuous feed is provided with a plurality of uniformly spaced points therealong where electromagnetic energy may be coupled therefrom. A corporate feed is also provided which has a corresponding number of output junctions. In operation, the delay line is adapted to receive a first signal from the variable frequency microwave source. Variations in this frequency will, of course, produce changes in the phase differences between the signals appearing at the uniformly spaced points along the delay line. The signal from this source is also mixed with a second signal provided by a second source in a manner to subtract the two frequencies, the resultant signal being filtered and applied to the corporate feed apparatus. Each of the signals appearing at the successive points along the delay line are applied together with an output signal from the corporate feed to a mixer which functions in a manner to subtract the frequency of the two signals. The output signals from the successive mixers are then filtered and result in a plurality of signals, successive ones of which have a phase difference controlled by the frequency of the first signal. The frequency of each of the plurality of output signals is, however, determined by the frequency of the second signal.

The above-mentioned and other features and objects of this invention and the manner of attaining them will become more apparent by reference to the following description taken in conjunction with the accompanying drawing, wherein the figure illustrates a schematic block diagram of the apparatus of the present invention.

Referring now to the drawing, the apparatus of the present invention comprises a delay line 10 which has a plurality of $m$ output junctions spaced at uniformly spaced points therealong. The delay line 10 may constitute, for example, a length of coaxial transmission line or waveguide. Further, the transmission line or waveguide may be arranged in the form of a sinuous feed to provide a delay line having increased phase differences between signals appearing at successive output junctions therealong. In operation, one extremity of the delay line 10 receives a signal having an independently variable frequency from a microwave signal generator 12. In that all transmission line and waveguide have normal dispersion, signals appearing at successive output junctions along the delay line 10 have a progressively increasing phase delay, the magnitude of which is dependent on the frequency of the signal. If the angular frequency appearing at the input of delay line 10 is designated as $\omega_1$, the frequency characteristic of the signal may be represented as $\cos \omega_1 t$. Thus, if the phase of the signal appearing at the input of delay line 10 is taken as a reference and the delay between successive ones of the $m$ output junctions along delay line 10 is $\varphi$ radians for the aforementioned angular frequency $\omega_1$, the frequency characteristics of the signals appearing at the $m$ output junctions of delay line 10 may be represented as follows:

*Table I*

| Output Junction along Delay line 10: | Frequency characteristic |
|---|---|
| Zero (i.e. Input) | $\cos \omega_1 t$ |
| First | $\cos (\omega_1 t - \varphi)$ |
| Second | $\cos (\omega_1 t - 2\varphi)$ |
| $(n-1)$ | $\cos [\omega_1 t - (n-1)\varphi]$ |
| $n$ | $\cos [\omega_1 t - n\varphi]$ |
| $(n+1)$ | $\cos [\omega_1 t - (n+1)\varphi]$ |
| $(m-3)$ | $\cos [\omega_1 t - (m-3)\varphi]$ |
| $(m-2)$ | $\cos [\omega_1 t - (m-2)\varphi]$ |
| $(m-1)$ | $\cos [\omega_1 t - (m-1)\varphi]$ |
| $m$ | $\cos [\omega_1 t - m\varphi]$ |

The signal provided by the signal generator 12 and applied to the input of delay line 10 is also applied to a mixer 14 along with a signal of angular frequency $\omega_2$ generated by a microwave signal generator 16. The signals appearing at the output terminals of mixer 14 are applied to a filter 18 which operates in a manner to isolate one of the signals having an angular frequency equal to the sum or difference of the angular frequencies of the signals generated by the signal generators 12, 16. In the present case, it will be assumed that the filter 18 isolates the signal having an angular frequency equal to the difference in the angular frequency of the signals provided by the generators 12, 16 whereby the frequency characteristic of the signal available at the output of the filter 18 may be represented as $\cos (\omega_1 - \omega_2)t$.

The signal appearing at the output of filter 18 is then applied to the input of a corporate feed 20. In the present case, the corporate feed 20 constitutes an apparatus which provides $(m+1)$ output junctions and operates in a manner such that the signals appearing at the output junctions are all of the same phase. This is accomplished by making the electrical lengths to be traversed by each signal when propagated from the input to any output of the corporate feed 20 the same. Thus, with the electrical length between the input and any output of the corporate feed 20 being the same, the phase delay produced by the insertion of the corporate feed 20 in the path of the signal frequency characteristic $\cos(\omega_1-\omega_2)t$ will be the same for a particular frequency and will be designated as $\phi_1$. Thus, the frequency characteristic of each signal appearing at an output of the corporate feed 20 may be represented as $\cos[(\omega_1-\omega_2)t-\phi_1]$.

The signal appearing at the input of the delay line 10 and signals appearing at the $m$ output junctions spaced at uniformly spaced points therealong are each applied together with one of the signals appearing at an output of the corporate feed 20 to the input circuits of one of a series of mixers $22_0$, $22_1$ . . . $22_m$. A filter 24 is then coupled to the output of each of the mixers, $22_0$, $22_1$ . . . $22_m$ for the purpose of isolating the signals having an angular frequency equal to the difference between the angular frequencies of the signals applied to the respective mixer $22_0$, $22_1$ . . . $22_m$. Thus the frequency characteristic of the signals appearing at the respective outputs of the filters 24 corresponding to the mixers $22_0$, $22_1$ . . . $22_m$ may be represented as follows:

Table II

| Mixer: | Frequency characteristic |
|---|---|
| $22_0$ | $\cos[\omega_2 t+\phi_1]$ |
| $22_1$ | $\cos[\omega_2 t-\phi+\phi_1]$ |
| $22_2$ | $\cos[\omega_2 t-2\phi+\phi_1]$ |
| $22_{(n-1)}$ | $\cos[\omega_2 t-(n-1)\phi+\phi_1]$ |
| $22_n$ | $\cos[\omega_2 t-n\phi+\phi_1]$ |
| $22_{(n+1)}$ | $\cos[\omega_2 t-(n+1)\phi+\phi_1]$ |
| $22_{(m-3)}$ | $\cos[\omega_2 t-(m-3)\phi+\phi_1]$ |
| $22_{(m-2)}$ | $\cos[\omega_2 t-(m-2)\phi+\phi_1]$ |
| $22_{(m-1)}$ | $\cos[\omega_2 t-(m-1)\phi+\phi_1]$ |
| $22_m$ | $\cos[\omega_2 t-m\phi+\phi_1]$ |

As is evident from Table II, the angular frequency of each output signal appearing at the output of a filter 24 is $\omega_2$ radians per second. It is thus apparent that the frequency, $$f_2 = \frac{\omega_2}{2\pi}$$

of the output signals is determined by the frequency of the microwave signal generator 16. Further, the phase difference, $\phi$, which exists between each successive output signal is determined by the dispersion of the delay line 10 and the frequency of the microwave signal generator 12. In that the dispersion of the delay line 10 remains constant in the present system, the phase difference, $\phi$, may be controlled by selecting the angular frequency, $\omega_1$. That is, the phase difference, $\phi$, which exists between signals appearing at successive outputs of filters 24 may be controlled by the variable frequency microwave signal generator 12. It is evident that the phase delay, $\phi_1$, which will change with changes in frequency, will not affect the phase difference between successive output signals of the present apparatus as there will always be cancellation.

What is claimed is:

1. An apparatus for producing a plurality of output signals of the same frequency, successive ones of said signals having a determinable phase difference, said apparatus comprising a delay line adapted to receive a variable frequency signal at one extremity thereof; means for providing output junctions at a plurality of spaced points along said delay line; a plurality of mixers, each one of said mixers corresponding to a different output junction along said delay line; means for coupling each of said output junctions to an input circuit of the mixer corresponding thereto; means for applying a signal differing in frequency from said variable frequency by a predetermined number of cycles per second to the remaining input circuit of each of said plurality of mixers; and means coupled to each of said mixers for isolating the signals appearing at the respective outputs thereof that are of a frequency equal to said predetermined number of cycles per second.

2. An apparatus for producing a plurality of output signals, successive ones of said signals having variable equal phase differences, said apparatus comprising a delay line adapted to receive a variable frequency signal at one extremity thereof; means for providing output junctions at a plurality of uniformly spaced points along said delay line; a plurality of mixers, each one of said mixers corresponding to a different output junction along said delay line and having first and second input circuits and an output circuit; means for coupling each of said output junctions to the first input circuit of the mixer corresponding thereto; and means for applying a signal differing in frequency from said variable frequency by a predetermined number of cycles per second to the second input circuit of each of said plurality of mixers whereby said plurality of output signals are available at the output circuits of said plurality of mixers.

3. The apparatus as defined in claim 2 wherein said delay line constitutes a length of waveguide.

4. The apparatus as defined in claim 2 wherein said delay line constitutes a length of coaxial line.

5. The apparatus as defined in claim 2 which includes additional means for controlling said predetermined number of cycles thereby to determine the frequency of said plurality of output signals.

6. An apparatus for producing a plurality of output signals, successive ones of said signals having determinable phase differences, said apparatus comprising a delay line adapted to receive a variable frequency signal at one extremity thereof; means for providing output junctions at a plurality of spaced points along said delay line; means for providing a source of signals, each of which is of the same phase and of a frequency which differs from said variable frequency by a predetermined number of cycles per second; and a plurality of means for mixing signals, individual ones of said signal mixing means being responsive to the signal available at the output junction corresponding thereto at a spaced point along said delay line and one of the signals provided by said source, thereby to produce said plurality of output signals.

7. An apparatus for producing a plurality of output signals, successive ones of said signals having variable equal phase differences, said apparatus comprising a first generator for providing a first variable frequency microwave signal; a delay line responsive to said first variable frequency signal, said delay line having a plurality of output junctions at uniformly spaced points therealong; a second generator for providing a second variable frequency microwave signals; means responsive to said first and second signals and including a first mixer for producing a third signal of a frequency equal to the difference in frequency between said first and second signals; a corporate feed responsive to said third signal for providing a plurality of reference signals, each of which are of the same relative phase and are of a frequency equal to the frequency of said third signal; and means including a plurality of mixers, each of said mixers being coupled to a different output junction along said delay line and responsive to one of said reference signals thereby to produce the plurality of output signals, the phase difference between successive ones of said output signals being controlled by the frequency of said first signal and the frequency of said output signals being independently controlled by the frequency of said second signal.

References Cited in the file of this patent

UNITED STATES PATENTS 2,680,151     Boothroyd _____ June 1, 1954

Disclaimer 3,005,960.—*Berl D. Levenson*, Los Angeles, Calif. APPARATUS FOR GENERATING MULTIPLE SIGNALS WITH INDEPENDENTLY CONTROLLABLE PHASE DIFFERENCES AND FREQUENCY. Patent dated Oct. 24, 1961. Disclaimer filed Mar. 28, 1962, by the assignee, *Hughes Aircraft Company*.

Hereby enters this disclaimer to claims 2, 3, and 6 of said patent.

[*Official Gazette May 8, 1962.*]